(12) United States Patent
Suefuji et al.

(10) Patent No.: US 8,491,399 B2
(45) Date of Patent: Jul. 23, 2013

(54) METHOD FOR MANUFACTURING FRP MEMBER WITH INSERT AND FRP MEMBER WITH INSERT

(75) Inventors: Shinichi Suefuji, Toyota (JP); Satoshi Yamaguchi, Nishikamo-gun (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 216 days.

(21) Appl. No.: 12/673,345

(22) PCT Filed: May 26, 2009

(86) PCT No.: PCT/JP2009/059606
§ 371 (c)(1),
(2), (4) Date: Feb. 12, 2010

(87) PCT Pub. No.: WO2009/145189
PCT Pub. Date: Dec. 3, 2009

(65) Prior Publication Data
US 2011/0158764 A1    Jun. 30, 2011

(30) Foreign Application Priority Data

May 29, 2008    (JP) ................................. 2008-141299

(51) Int. Cl.
*B21B 53/24*    (2006.01)
*B21H 3/08*    (2006.01)
*B23P 17/00*    (2006.01)
*B29C 67/00*    (2006.01)

(52) U.S. Cl.
USPC .......... 470/18; 29/527.1; 29/527.2; 29/419.1; 264/136

(58) Field of Classification Search
USPC .......... 411/337, 427, 900–903, 908; 427/230; 264/136, 241; 470/18, 87, 96; 29/419.1, 525.02, 29/527.1, 527.2; 52/364, 787.1
See application file for complete search history.

(56) References Cited

U.S. PATENT DOCUMENTS

| | | | | |
|---|---|---|---|---|
| 3,975,479 A | * | 8/1976 | McClean | 264/102 |
| 4,318,879 A | * | 3/1982 | Gartner | 264/163 |
| 4,576,847 A | * | 3/1986 | Tajima | 428/67 |
| 4,623,290 A | * | 11/1986 | Kikuzawa et al. | 411/350 |
| 4,792,475 A | * | 12/1988 | Bien | 428/137 |

(Continued)

FOREIGN PATENT DOCUMENTS

| | | |
|---|---|---|
| JP | 61-024971 B2 | 5/1981 |
| JP | 3-31113 U | 3/1991 |

(Continued)

*Primary Examiner* — Victor Batson
*Assistant Examiner* — Tyler Johnson
(74) *Attorney, Agent, or Firm* — Sughrue Mion, PLLC (57) ABSTRACT

Provided is a method for manufacturing an FRP member with insert which enables to reduce a machining time to improve productivity. First, a threaded hole 11 is formed in an insert 3. An FRP member 2 where at least the threaded hole 11 of the insert 3 is covered with a coating 4 made of FRP is molded. A counter-bored hole 31 that penetrates the coating 4 of the FRP member 2 to communicate with the threaded hole 11 of the insert 3 is formed, to thereby obtain an FRP component 1 with insert. Accordingly, a machining step after molding the FRP member 2 in which dry machining is required includes only the boring step of forming the counter-bored hole 31 in the FRP member 2. Thus, the machining time can be reduced, and the productivity can be improved.

3 Claims, 5 Drawing Sheets

U.S. PATENT DOCUMENTS

| | | | | |
|---|---|---|---|---|
| 4,983,430 | A * | 1/1991 | Sargent | 428/34.1 |
| 5,079,055 | A * | 1/1992 | Doyle | 428/36.2 |
| 5,080,547 | A * | 1/1992 | Moghe | 411/436 |
| 5,114,290 | A * | 5/1992 | Moghe | 411/411 |
| 5,397,415 | A * | 3/1995 | Manabe et al. | 156/234 |
| 5,480,508 | A * | 1/1996 | Manabe et al. | 156/353 |
| 6,056,912 | A * | 5/2000 | Sohda et al. | 264/478 |
| 6,212,755 | B1 * | 4/2001 | Shimada et al. | 29/527.1 |
| 6,427,403 | B1 * | 8/2002 | Tambakis | 52/309.1 |
| 6,681,473 | B1 * | 1/2004 | Liu et al. | 29/458 |
| 6,910,826 | B1 * | 6/2005 | Damiano | 403/2 |
| 7,100,262 | B2 * | 9/2006 | Carter | 29/464 |
| 7,357,726 | B2 * | 4/2008 | Thorning | 470/16 |
| 8,336,181 | B2 * | 12/2012 | Corre et al. | 29/419.1 |
| 2001/0008041 | A1 * | 7/2001 | Shimada et al. | 29/527.1 |
| 2005/0123374 | A1 * | 6/2005 | Thorning | 411/82.3 |
| 2009/0056865 | A1 * | 3/2009 | Kubota et al. | 156/247 |
| 2010/0040433 | A1 * | 2/2010 | Poppe et al. | 411/432 |

FOREIGN PATENT DOCUMENTS

| | | |
|---|---|---|
| JP | 5-253946 A | 10/1993 |
| JP | 4026319 B2 | 8/2002 |
| JP | 2007-315470 A | 12/2007 |
| JP | 2008-039118 A | 2/2008 |
| JP | 2008-051224 A | 3/2008 |

* cited by examiner

METHOD FOR MANUFACTURING FRP MEMBER WITH INSERT AND FRP MEMBER WITH INSERT

CROSS REFERENCE TO RELATED APPLICATIONS

This application is a National Stage of International Application No. PCT/JP2009/059606 filed May 26, 2009, claiming priority based on Japanese Patent Application No. 2008-141299, filed May 29, 2008, the contents of all of which are incorporated herein by reference in their entirety.

TECHNICAL FIELD

The present invention relates to a method for manufacturing an FRP (Fiber Reinforced Plastics) member that encompasses an insert, and an FRP member with insert.

BACKGROUND ART

A conventional method of mounting a mounting component on an FRP member includes a method of embedding a metal insert in the FRP member, and fastening the mounting component by use of a threaded hole of the insert.

Figure 8:
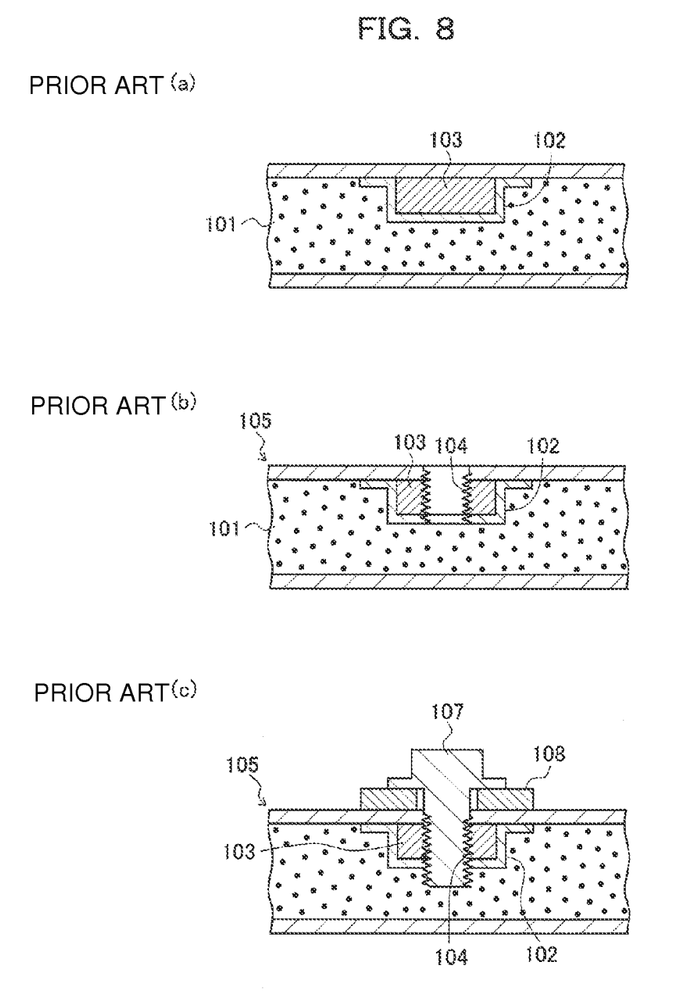
FIG. 8 are process drawings for explaining a conventional technique.

For example, as shown in FIG. 8, Patent Document 1 discloses a technique of molding FRP after foam-forming a core 101 from a foam where a concave hole 102 is provided and placing a metal block 103 as an insert in the concave hole 102 (see FIG. 8(a)), forming a threaded hole 104 by tapping the internal metal block 103 through a coating made of FRP in an obtained FRP member 105 (see FIG. 8(b)), and mounting a mounting component 108 by screwing a bolt 107 into the threaded hole 104 (see FIG. 8(c)).

Meanwhile, when oil attaches to FRP, the FRP may be reduced in strength. Also, at the time of bonding the FRP members together by an adhesive, for example, adhesion therebetween may be inhibited by the oil attaching thereto, to thereby deteriorate adhesiveness. Thus, in the case of the aforementioned conventional method of forming the threaded hole 104 in the metal block 103 after molding the FRP member 105, the threaded hole 104 is formed not by wet machining that uses cutting oil, but by dry machining that does not use cutting oil.

Patent Document 1: JP Patent Publication (Kokai) No. 5-253946A (1993)

DISCLOSURE OF THE INVENTION

Problems to be Solved by the Invention

However, the dry machining is performed at a super slow speed, and thus requires a longer machining time in comparison with the wet machining. In the conventional method described above, it is necessary to perform the dry machining in two steps of forming a pilot hole in the metal block 103 and tapping the pilot hole, in order to form the threaded hole 104 in the metal block 103. Thus, the method requires a long machining time.

Especially when the FRP member is a side member that constitutes the body of an automobile, for example, several tens to several hundreds of inserts are provided therein. When the dry machining is performed with respect to all the inserts, the machining time becomes extremely long. Thus, productivity cannot be improved by the conventional method, so that manufacturing cost rises.

The present invention has been made in view of the aforementioned problems, and it is an object of the present invention to provide a method for manufacturing an FRP member with insert which enables to reduce a machining time to improve productivity, and an FRP member with insert.

Means for Solving the Problems

In order to achieve the above object, a method for manufacturing an FRP member with insert according to the present invention is a method for manufacturing an FRP member with insert that encompasses an insert having a threaded hole, including: an insert machining step of forming the threaded hole in the insert; an FRP molding step of molding an FRP member where at least the threaded hole of the insert formed in the insert machining step is covered with a coating made of FRP; and a boring step of forming a communication hole that penetrates the coating of the FRP member molded in the FRP molding step to communicate with the threaded hole of the insert.

With the method for manufacturing an FRP member with insert according to the present invention, the threaded hole is formed in the insert, and the FRP member where at least the threaded hole of the insert is covered with the coating made of FRP is molded. After that, the boring process is performed to form the communication hole that penetrates the coating of the FRP member to communicate with the threaded hole of the insert. Therefore, a machining step after molding the FRP member in which dry machining is required includes only the boring step.

Accordingly, in comparison with a conventional method in which two machining steps of forming a pilot hole in an FRP member and tapping the pilot hole to form a threaded hole are performed after molding the FRP member, a machining time required for the dry machining can be reduced. Accordingly, productivity can be improved, and manufacturing cost can be reduced.

In the FRP molding step, the FRP member may be molded with the threaded hole of the insert being filled and blocked with a sealing material. Accordingly, it is possible to prevent a resin solution of FRP from entering the threaded hole of the insert, to thereby prevent the threads of the threaded hole from being blocked with a hard resin in the FRP molding step.

In the FRP molding step, the FRP member may be molded with an opening portion of the threaded hole being blocked with a sealing tape. Accordingly, the sealing effect of the sealing tape is combined with that of the sealing material, to thereby reliably prevent the resin solution from entering the threaded hole of the insert.

In the FRP molding step, the FRP member may be heat-molded with an opening portion side of the threaded hole being blocked with the sealing material to form a hermetically sealed void portion inside the threaded hole. Accordingly, gas inside the void portion is allowed to expand by using heat from the heat molding, to thereby maintain the inside of the void portion at a high pressure, and prevent the resin solution from entering the threaded hole.

The method for manufacturing an FRP member with insert according to the present invention may further include a collar mounting step of inserting a collar into the communication hole and mounting the collar on the FRP member with a distal end of the collar abutting the insert and a proximal end of the collar projecting from the coating after the boring step. Accordingly, a mounting member can be mounted with the collar being interposed between the insert and the mounting member. It is thus possible to prevent the coating of the FRP member from being compressed between the insert and the mounting member when a mounting bolt is fastened, and prevent time degradation such as a sag.

In the FRP member with insert manufactured by the manufacturing method according to the present invention, the communication hole may have an inner diameter larger than that of the threaded hole. With such a configuration, the displacement of the insert relative to the FRP member can be tolerated, to thereby reliably allow the communication hole to communicate with the threaded hole.

The threaded hole may include a straight hole portion formed with a constant diameter in the insert, and a female threaded portion threadedly formed continuously from and coaxially with the straight hole portion. When a mounting bolt is screwed into the female threaded portion of the threaded hole, the mounting bolt can be guided to be oriented such that the central axis line of the mounting bolt is aligned with the central axis line of the female threaded portion by providing the straight hole portion in the threaded hole as described above. The mounting operability of the mounting bolt can be thereby improved.

The FRP member with insert may include a collar inserted into the communication hole such that a distal end abuts the insert and a proximal end projects from the coating. With such a configuration, a mounting member can be mounted with the collar being interposed between the insert and the mounting member. It is thus possible to prevent the coating of the FRP member from being compressed between the insert and the mounting member when the mounting bolt is fastened, and prevent time degradation such as a sag.

Advantages of the Invention

With the present invention, the machining step after molding the FRP member in which the dry machining is required includes only the boring step of forming the communication hole that penetrates the coating of the FRP member to communicate with the threaded hole of the insert. Thus, in comparison with the conventional method, the machining time required for the dry machining can be reduced. Accordingly, the entire machining time of the FRP member can be reduced, the productivity can be improved, and the manufacturing cost can be reduced.

The present description includes the contents as disclosed in the description and/or drawings of JP Patent Application No. 2008-141299, which is a priority document of the present application.

DESCRIPTION OF SYMBOLS

1 . . . FRP member with insert, 2 . . . FRP member, 3 . . . Insert, 4 . . . Coating, 11 . . . Threaded hole, 12 . . . Straight hole portion, 13 . . . Female threaded portion, 14 . . . Void portion, 21 . . . Sealing material, 22 . . . Sealing tape, 31 . . . Counter-bored hole (Communication hole), 41 . . . Collar, 51 . . . Mounting member, 53 . . . Mounting bolt

BEST MODE FOR CARRYING OUT THE INVENTION

Next, embodiments according to the present invention will be described with reference to the drawings.

Figure 1:
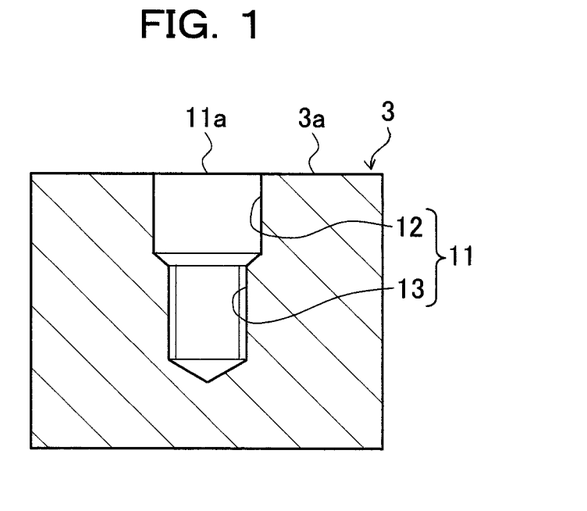
FIG. 1 is a sectional view of an insert for explaining a threaded hole machining step.
Figure 2:
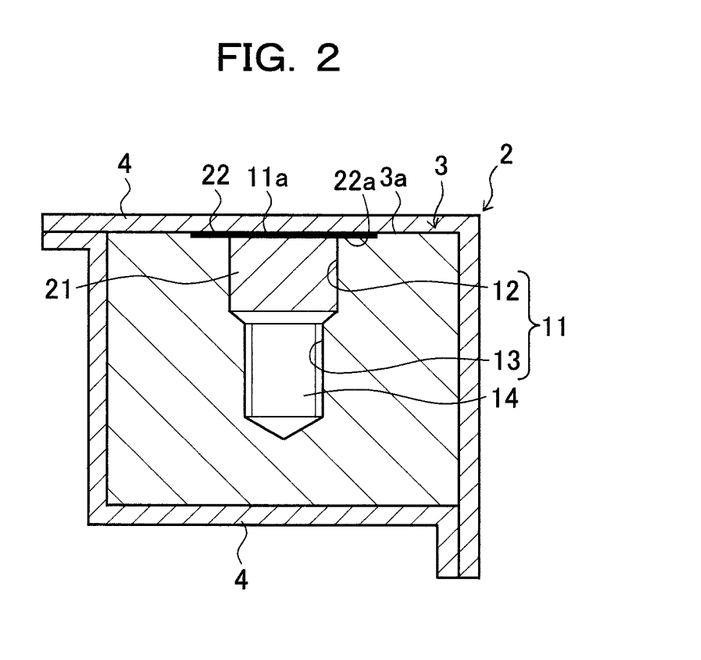
FIG. 2 is a sectional view of an FRP member for explaining an FRP molding step.
Figure 3:
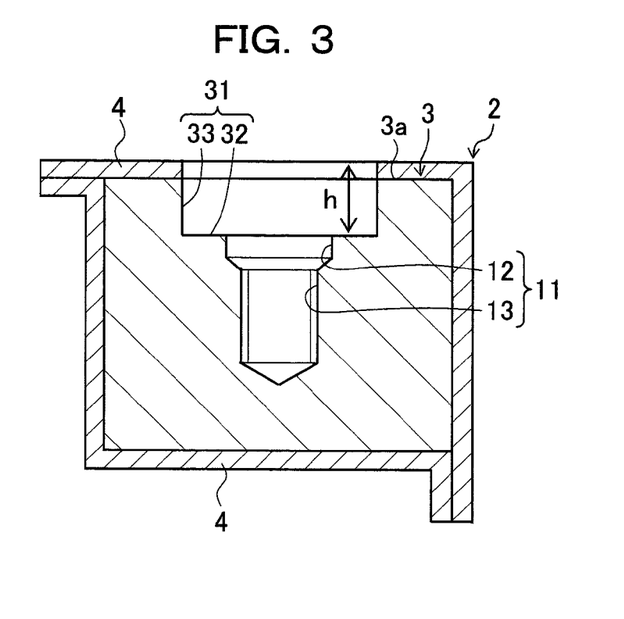
FIG. 3 is a sectional view of the FRP member for explaining a boring step.
Figure 4:
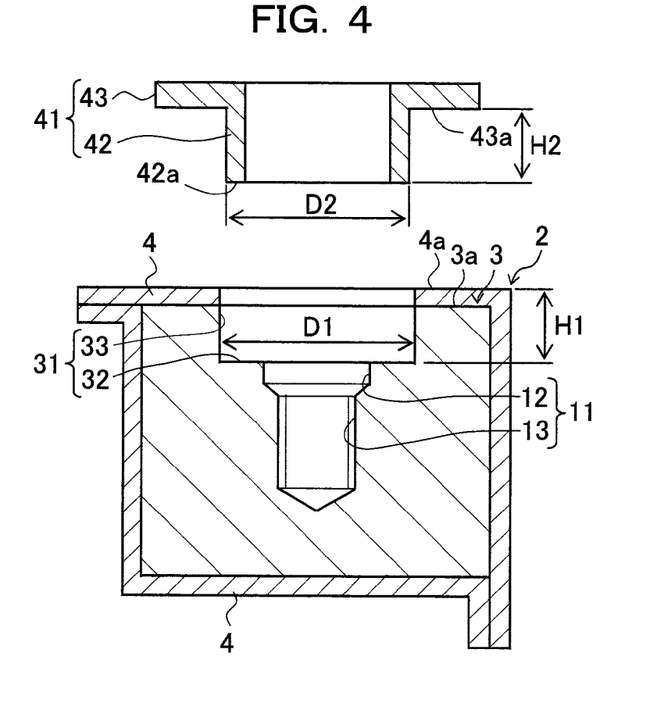
FIG. 4 is a sectional view of the FRP member for explaining a collar member mounting step.
Figure 5:
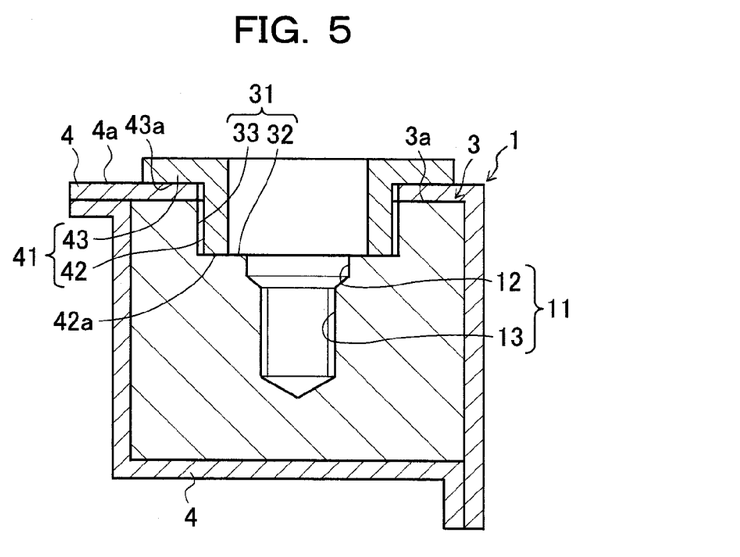
FIG. 5 is a sectional view illustrating a finished state of an FRP member with insert.
Figure 6:
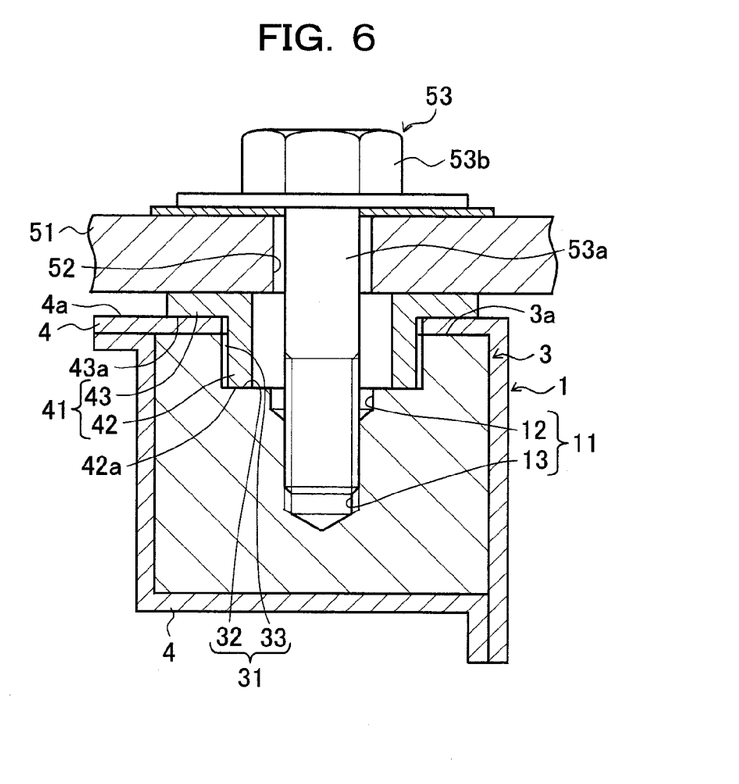
FIG. 6 is a sectional view illustrating an example in which the FRP member with insert is in a fastened state.

FIG. 1 is a sectional view of an insert 3 for explaining an insert machining step. FIG. 2 is a sectional view of an FRP member 2 for explaining an FRP molding step. FIG. 3 is a sectional view of the FRP member 2 for explaining a boring step. FIG. 4 is a sectional view of the FRP member 2 for explaining a collar mounting step. FIG. 5 is a sectional view illustrating a finished state of an FRP member 1 with insert. FIG. 6 is a sectional view illustrating an example in which the FRP member 1 with insert is in a fastened state. Although the upper side and the lower side in the drawings are respectively referred to as an upper side and a lower side for the convenience of description, the upper side and the lower side do not necessarily correspond to those relative to the ground.

In a present embodiment, the FRP member 1 with insert can be obtained through the four machining steps of the insert machining step, the FRP molding step, the boring step, and the collar mounting step.

[Insert Machining Step]

The insert 3 includes a block-shaped member made of metal such as aluminum, or of a hard resin. A threaded hole 11 is formed therein by wet machining. The threaded hole 11 is formed downward from an upper surface 3a of the insert 3, and includes a straight hole portion 12 formed from the upper surface 3a to a predetermined depth with a constant diameter, and a female threaded portion 13 threadedly formed continuously from and coaxially with the straight hole portion 12 as shown in FIG. 1. The hole diameter of the straight hole portion 12 is set to be larger than that of the female threaded portion 13.

[FRP Molding Step]

In the FRP molding step, the FRP member 2 encompassing the insert 3 is molded. First, a process of blocking the threaded hole 11 of the insert 3 with a sealing material 21 is performed before the molding of FRP. A silicone that is an expansive resin is used as the sealing material 21. The sealing material 21 is filled in the threaded hole 11 in advance and cured therein, to thereby block the threaded hole 11.

The sealing material 21 is filled in the straight hole portion 12 on the side of an opening portion 11a of the threaded hole 11, so that a hermetically sealed void portion 14 is formed inside the female threaded portion 13 on the distal end side of the threaded hole 11 as shown in FIG. 2. Air inside the void portion 14 is allowed to expand by using heat (about 130° C.) from heat molding at the time of molding the FRP member 2. Accordingly, the inside of the void portion 14 is maintained at a high pressure, and a resin solution is prevented from entering the threaded hole 11.

After the sealing material 21 is filled in the threaded hole 11, the opening portion 11a of the threaded hole 11 is blocked with a sealing tape 22. The sealing tape 22 prevents the resin solution from entering the threaded hole 11, and also prevents oil from exuding from the sealing material 21 and attaching to a coating 4 at the time of molding the FRP member 2. The sealing tape 22 is made of a resin material such as Teflon (Registered Trademark), and is formed into a sheet shape. An adhesive is applied to an adhesion surface 22a that is bonded to the insert 3.

Subsequently, the FRP member 2 encompassing the insert 3 is molded. The FRP member 2 is molded by using a vacuum-pack molding method. To be more specific, the insert 3 is disposed such that the opening portion 11a of the threaded hole 11 opens upward. The insert 3 coated with the coating 4 made of FRP is placed on a molding surface of an unillustrated mold. The insert 3 coated with the coating 4 and the mold are covered by a sheet-type vacuum pack. The vacuum pack is vacuumed, to thereby press the FRP member 2 on the molding surface. The FRP member 2 is heated and molded in such a state.

A prepreg obtained by impregnating a fiber base made of reinforced fiber such as glass fiber and carbon fiber with a heat-curable resin solution that becomes a matrix resin is used as the coating 4. Please note that the molding of FRP is not limited to the vacuum-pack molding method, and the FRP may be also molded by an RI method, an RTM molding method, an S-RIM method or the like. Please also note that the coating 4 is not limited to the prepreg. For example, the coating 4 may be heat-molded by injecting a resin solution into a mold and impregnating a fiber base therewith.

The FRP member 2 encompasses the insert 3 with the insert 3 being wrapped by the upper coating 4 and the lower coating 4. The upper coating 4 and the lower coating 4 are welded and united together at a peripheral portion by employing a joined structure of the upper surface and lower surface coatings 4.

[Boring Step]

Here, a counter-bored hole 31 (a communication hole) communicating with the threaded hole 11 of the insert 3 is formed in the FRP member 2. The counter-bored hole 31 is formed by dry machining that does not use cutting oil. The counter-bored hole 31 is formed from outside the FRP member 2 at a position where the threaded hole 11 of the insert 3 is expected to be located so as to communicate with the threaded hole 11. In the present embodiment, the counter-bored hole 31 is formed by inserting an unillustrated drill cutter from above the FRP member 2 on the side where a mounting member is to be mounted.

The counter-bored hole 31 is formed into the insert 3 from the upper surface 3a of the insert 3 through the upper surface coating 4 as shown in FIG. 3. A depth (h) of the counter-bored hole 31 is set to a depth reaching an intermediate position of the straight hole portion 12 in an axial direction.

The counter-bored hole 31 is formed with an inner diameter larger than that of the straight hole portion 12 of the threaded hole 11 so as to communicate with the threaded hole 11 while tolerating the displacement of the insert 3 relative to the FRP member 2. A bottom face 32 of the counter-bored hole 31 is opposed to the upper opening portion.

Since the counter-bored hole 31 is shallower than the threaded hole 11 and also does not have threads, the counter-bored hole 31 can be formed within a short machining time even by the dry machining. The sealing tape 22 and the sealing material 21 (see FIG. 2) are cut away with the FRP member 2 and thereby eliminated at the time of boring the counter-bored hole 31.

[Collar Mounting Step]

Here, a collar 41 is mounted on the counter-bored hole 31. The collar 41 is inserted into the counter-bored hole 31, so that a distal end portion 42a abuts the bottom face 32 of the counter-bored hole 31, and a proximal end projects from the coating 4. To be more specific, the collar 41 includes a ring cylindrical portion 42, and a flange portion 43 projecting outward in a radial direction at one end of the cylindrical portion 42 as shown in FIG. 4.

A mounting bolt 53 (see FIG. 6) can be inserted through the cylindrical portion 42. Also, the cylindrical portion 42 has a predetermined distance with an inner peripheral surface 33 of the counter-bored hole 31 (D1>D2) so as to tolerate the movement of the collar 41 in the radial direction relative to the counter-bored hole 31 when the cylindrical portion 42 is inserted into the counter-bored hole 31 as shown in FIG. 5. Thus, even when there is a displacement between the threaded hole 11 and the counter-bored hole 31, the collar 41 is moved to arrange the center of the collar 41 at a position aligned with the center of the threaded hole 11.

A lower surface 43a of the flange portion 43 is in abutment against the upper surface 4a of the coating 4 (H1=H2) with the cylindrical portion 42 being inserted into the counter-bored hole 31 and the distal end portion 42a of the cylindrical portion 42 abutting the bottom face 32. Since an adhesive is applied to the lower surface 43a of the flange portion 43, the lower surface 43a is bonded to the upper surface 4a of the coating 4, to thereby fix the collar 41.

As described above, the FRP member 1 with insert shown in FIG. 5 can be obtained through the four machining steps of the insert machining step, the FRP molding step, the counter-boring step, and the collar mounting step.

FIG. 6 is a sectional view illustrating an example in which a mounting member 51 is mounted on the FRP member 1 with insert. A mounting hole 52 is provided in the mounting member 51, and the mounting bolt 53 is inserted therethrough. The distal end of the mounting bolt 53 is inserted into the threaded hole 11 of the insert 3 to be screwed into the female threaded portion 13. The mounting member 51 is held between the flange portion 43 of the collar 41 and a head portion 53b of the mounting bolt 53 and is thereby fixed.

The mounting hole 52 of the mounting member 51 has an inner diameter large enough to form a predetermined distance with a shaft portion 53a of the mounting bolt 53 that is inserted into the mounting hole 52, so that the position of the mounting member 51 relative to the FRP member 1 with insert can be adjusted in a direction perpendicular to the axial direction of the mounting bolt 53.

With the method for manufacturing the FRP member 1 with insert described above, the threaded hole 11 is formed in the insert 3 first. The FRP member 2 where at least the threaded hole 11 of the insert 3 is covered with the coating 4 is molded. After that, the counter-bored hole 31 is formed in the FRP member 2, to thereby obtain the FRP member 1 with insert.

Accordingly, the machining step after molding the FRP member in which the dry machining is required includes only the boring step of forming the counter-bored hole 31 in the FRP member 2, and the threaded hole of the insert 3 can be made by the wet machining.

Therefore, the machining time required for the dry machining can be significantly reduced in comparison with a conventional method in which two machining steps of forming a pilot hole in an FRP member and tapping the pilot hole to form a threaded hole are performed.

Thus, even if the FRP member 1 with insert has several tens to several hundreds of inserts like a side member that constitutes the body of an automobile, for example, the FRP member 1 with insert can be manufactured within a short time. Since the threaded hole is machined in the insert 3 when the insert 3 is provided by itself, a small machining apparatus can be used, to thereby keep the facility cost low. Accordingly, the productivity of the FRP member 1 with insert can be improved and the manufacturing cost can be reduced.

Also, with the method for manufacturing the FRP member with insert described above, since the threaded hole 11 is filled and blocked with the sealing material 21 made of the expansive resin such as a silicone (a first stage), a resin solution exuding from the prepreg, or a resin solution injected into a cavity portion of an unillustrated mold, for example, can be prevented from entering the threaded hole 11 in the FRP molding step.

Since the void portion 14 is formed on the distal end side of the threaded hole 11 by filling the sealing material 21 on the proximal end side of the threaded hole 11 (a second stage), the gas inside the void portion 14 is allowed to expand by use of the heat from heat molding, to thereby maintain the inside of the void portion 14 at a high pressure. The resin solution can be thereby prevented from entering the threaded hole 11.

Furthermore, the opening portion 11a of the threaded hole 11 (see FIG. 2) is blocked with the sealing tape 22 after filling the sealing material 21 in the threaded hole 11 (a third stage) and the FRP is molded in such a state. Therefore, the sealing effect of the threaded hole 11 can be further improved.

The threaded hole 11 is sealed by using the three methods from the first to third stages as described above. Accordingly, the resin solution can be reliably prevented from entering the threaded hole 11 in the FRP molding step.

With the structure of the insert 3 described above, the straight hole portion 12 is provided on the proximal end side of the threaded hole 11, and the depth of the counter-bored hole 31 is set within the range of the straight hole portion 12. Therefore, the threads of the female threaded portion 13 of the threaded hole 11 can be prevented from being destroyed due to the boring step of the counter-bored hole 31. It is thus not necessary to tap the threads of the female threaded portion 13 again after the boring step, to thereby make the manufacturing operation more efficient.

When the mounting bolt 53 is screwed into the threaded hole 11, the mounting bolt 53 can be actively guided to be oriented such that the central axis line of the mounting bolt 53 is aligned with the central axis line of the threaded hole 11 by not cutting away the entire straight hole portion 12 but slightly leaving the straight hole portion 12 at the time of boring the counter-bored hole 31. The mounting operability of the mounting bolt 53 can be thereby improved.

With the structure of the insert 3 described above, the collar 41 is inserted into the counter-bored hole 31, and is thereby interposed between the insert 3 and the mounting member 51. Accordingly, the coating 4 interposed between the lower surface 43a of the flange portion 43 and the upper surface 3a of the insert 3 can be prevented from being compressed due to the fastening of the mounting bolt 53.

Thus, in comparison with a structure in which the mounting member 51 is directly mounted on the FRP member 1 with insert without using the collar 41 as in an insert structure described below shown in FIG. 7, time degradation such as a sag due to the compression of the coating 4 does not occur, so that the mounting bolt 53 can be prevented from being loosened due to such time degradation.

Please note that the present invention should not be limited to the aforementioned embodiment, and various changes may be made therein without departing from the scope of the present invention.

Figure 7:
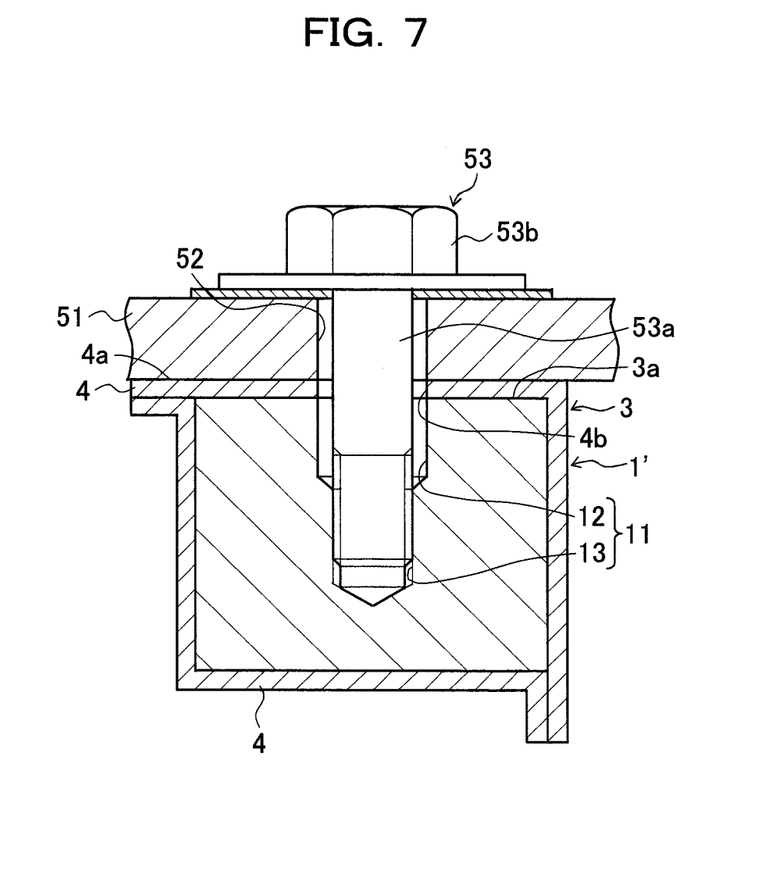
FIG. 7 is a view for explaining another embodiment according to the present invention.

For example, the collar 41 in the aforementioned embodiment may be omitted as shown in FIG. 7 in a fastened portion where a great power is not applied. With the insert structure as another embodiment of the present invention shown in FIG. 7, an FRP member 1' with insert that encompasses the insert 3 having the threaded hole 11 can be easily manufactured only by forming the opening portion 4b by cutting away the coating 4 in the boring step.

The invention claimed is:

1. A method for manufacturing a Fiber Reinforced Plastics (FRP) member with insert that encompasses an insert having a threaded hole, the method comprising;
    an insert machining step of forming the threaded hole in the insert;
    an FRP molding step of molding an FRP member where at least the threaded hole of the insert formed in the insert machining step is covered with a coating made of FRP and
    a boring step of forming a communication hole that penetrates the coating of the FRP member molded in the FRP molding step to communicate with the threaded hole of the insert,
    wherein in the FRP molding step, the FRP member is molded with the threaded hole of the insert being filled and blocked with a sealing material, and
    wherein in the FRP molding step, the FRP member is molded with an opening portion of the threaded hole being blocked with a sealing tape.

2. A method for manufacturing a Fiber Reinforced Plastics (FRP) member with insert that encompasses an insert having a threaded hole, the method comprising;
    an insert machining step of forming the threaded hole in the insert;
    an FRP molding step of molding an FRP member where at least the threaded hole of the insert formed in the insert machining step is covered with a coating made of FRP; and
    a boring step of forming a communication hole that penetrates the coating of the FRP member molded in the FRP molding step to communicate with the threaded hole of the insert,
    wherein in the FRP molding step, the FRP member is molded with the threaded hole of the insert being filled and blocked with a sealing material, and
    wherein in the FRP molding step, the FRP member is heat-molded with an opening portion side of the threaded hole being blocked with the sealing material to form a hermetically sealed void portion inside the threaded hole.

3. A method for manufacturing a Fiber Reinforced Plastics (FRP) member with insert that encompasses an insert having a threaded hole, the method comprising:
    an insert machining step of forming the threaded hole in the insert;
    an FRP molding step of molding an FRP member where at least the threaded hole of the insert formed in the insert machining step is covered with a coating made of FRP;
    a boring step of forming a communication hole that penetrates the coating of the FRP member molded in the FRP molding step to communicate with the threaded hole of the insert;
    a collar mounting step of inserting a collar into the communication hole and mounting the collar on the FRP member with a distal end of the collar abutting the insert and a proximal end of the collar projecting from the coating after the boring step.

* * * * *